March 6, 1934.   E. A. HECKLER   1,949,910
ELECTRIC MOTOR
Original Filed June 10, 1933   4 Sheets-Sheet 1

INVENTOR
Ernest A. Heckler
BY
A. B. Purvis
ATTORNEY

March 6, 1934.   E. A. HECKLER   1,949,910
ELECTRIC MOTOR
Original Filed June 10, 1933    4 Sheets-Sheet 2

INVENTOR
Ernest A. Heckler
BY  A. B. Rivoir
ATTORNEY

March 6, 1934.   E. A. HECKLER   1,949,910
ELECTRIC MOTOR
Original Filed June 10, 1933   4 Sheets-Sheet 4

INVENTOR
Ernest A. Heckler
BY
A. B. Reavis
ATTORNEY

Patented Mar. 6, 1934

1,949,910

UNITED STATES PATENT OFFICE 1,949,910

ELECTRIC MOTOR

Ernest A. Heckler, Lansdale, Pa.

Original application June 10, 1933, Serial No. 675,199. Divided and this application June 20, 1933, Serial No. 676,739

19 Claims. (Cl. 172—239).

This application is a division of my application Serial No. 675,199, filed June 10, 1933.

My invention relates to an electric motor and it has for an object to provide apparatus of this character capable of intermittent rotary movement.

My improved motor includes relatively movable field and armature elements and the armature element has propelling and holding windings. A plurality of spaced commutator groups and brushes cooperating with the latter provide for successive movement cycles which are definitely terminated at predetermined points. Each commutator group includes segments connected to the propelling and holding windings; and, as current is supplied to the propelling segments, a movement cycle occurs, the movement cycle being terminated with passage of the brush over the propelling segments and with full engagement thereof with the holding segment. From the time that a brush moves past the center line of a propelling segment immediately preceding a holding segment until the brush is in full engagement with the holding segment, due to field distortion in consequence of armature reaction, both the propelling and holding armature conductors develop diminishing net positive torque, with the result that the armature is effectively braked immediately preceding the last step of each movement cycle, the last step being the maximum linkage of field flux by the proper holding winding with the field undistorted, which condition occurs as soon as the brush is fully engaged with a holding segment. Thus it will be seen that a movement cycle starts with a brush engaging a propelling segment and ends with the brush engaging the holding segment of a group. I provide two sets of brushes arranged so that, as one set engages holding segment or segments of group or groups, the other set is brought to starting position with respect to propelling segment or segments of other group or groups. If the motor is grounded, only one segment group and one brush are necessary for a movement cycle. Means is provided for alternately supplying electric current to the brushes. Therefore, a more specific object of my invention is to provide apparatus of the above character capable of giving successive movement cycles separated by dwells.

A further object of my invention is to provide an intermittent rotary electric motor which is constructed and arranged to provide for definite or predetermined movement cycles.

A more particular object of my invention is to provide a motor having the following advantageous features of construction and operation: First, means for starting the rotor from rest at a predetermined point on the rotor when that point lies in a plane of reference which includes the rotor axis; second, to provide means by which the rotor is stopped at a second predetermined point on the rotor and removed from the first point a fraction of a revolution when the second point lies in the plane of reference; third, to make provision for holding the rotor stationary at the second point until such time as additional motion is required; and, fourth, to make provision by which the above motions may be repeated, in the order named, indefinitely, and thus provide an electric motor which will deliver intermittent rotary motion.

A further object of my invention is to provide an electric motor having an armature provided with propelling and holding windings together with circumferentially spaced groups of commutator segments providing for starting of the rotor, thereafter in reducing the torque due to the effect of armature reaction and to reduction in current supplied to the propelling winding, and finally providing for termination of the movement cycle due to the effect of the holding winding being positioned to thread or pass the maximum flux.

These and other objects are effected by my invention as will be apparent from the following description and claims taken in connection with the accompanying drawings in which:

Figure 1:
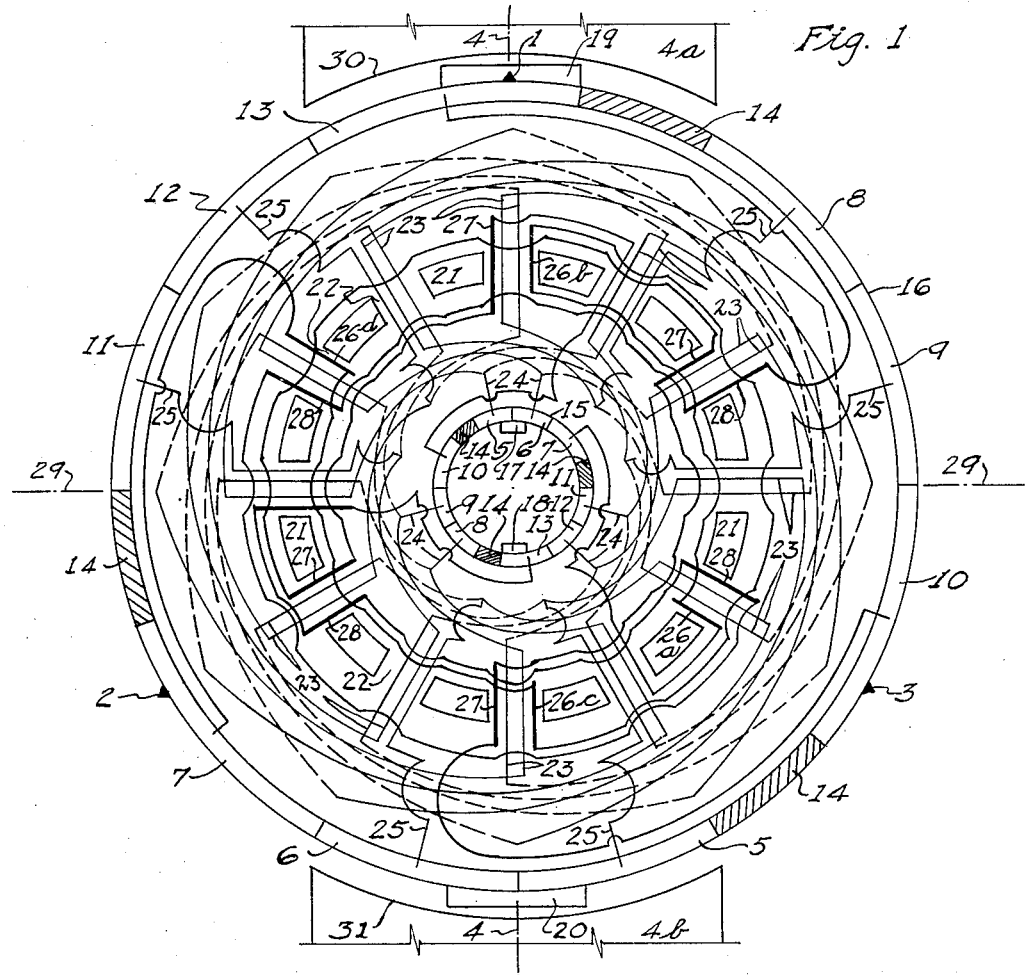
Fig. 1 is a circular development of the entire winding of the intermittent rotary electric motor, with the commutators and connections shown diagrammatically.

Referring now to Figs. 1 to 6, inclusive, I show an intermittent rotary electric motor of the two-pole type using direct current to excite the field and one having a lap armature winding, but, so far as the objects of my invention are concerned, it is not essential that the machine have only a single pair of poles, or use direct current, for the same principles are applicable to motors having two or more sets of poles or which use alternating current. The principles are also applicable when the armature is made the stator and the field is made the rotor as well as when other types of armature windings are used.

In Figs. 1, 6 and 7, 1, 2, and 3 represent predetermined points on the armature at which it is proposed to cause the armature to start from rest, or come to rest, when any of these points lie in the plane of reference indicated at 4, which includes the longitudinal center line of the pole pieces 4a and 4b.

The armature is provided with circumferentially spaced groups of commutator segments co-operating with the pairs of brushes 17, 20 and 19, 18 so as to secure intermittent movement cycles the arrangement being such that, with completion of a movement cycle incident to one pair of brushes traversing a pair of segment groups, the other pair of brushes will be placed in initial position with respect to the pair of succeeding groups of segments, and, when current is supplied to the latter pair of brushes, the next movement cycle will take place. Distributors are provided, as elsewhere herein more particularly described, for supplying current alternately to the pairs of brushes.

The commutator segments 5, 6, and 7, of low resistance and separated from each other by a suitable dielectric, are grouped to transmit current during one cycle of motion; during the next movement cycle, the groups of commutator segments 8, 9, and 10 are effective; and the following cycle is taken care of by the groups of commutator segments 11, 12, and 13. After completion of the movement cycle, with the segment groups 11, 12, and 13 effective, the segments 5, 6, and 7 are positioned for the next cycle and so on. Each group of commutator segments is separated from the following group by a segment of dielectric 14. For purposes which will later appear, the segments of the groups may be of unequal length of arc, and they are insulated from and fastened to the armature shaft by any of the usual means.

I prefer to use two like commutators, 15 and 16, which, when placed on the same central axis, have like segments on either commutator 180 circular degrees apart. The commutators are preferably placed at either end of the armature.

Each commutator has two brushes sliding thereon. Brushes 17 and 18 slide on the commutator 15 and brushes 19 and 20 slide on the commutator 16. The brushes are of such resistance as is consistent with good commutation.

The brushes 17 and 19 are alternately connected to the source of electric current so as to transmit current into the commutators 15 and 16, and the brushes 18 and 20 are alternately connected so as to transmit current away from the commutators. Brushes 17 and 20 act in unison to pass current through the armature, while the brushes 19 and 18 are in an open circuit, and vice versa, as will be explained later.

In the drawings, 21 represents the face of an armature post. Between adjacent posts, a space or slot 22 is provided sufficient in size to pass the required amount of conductors. Each conductor may be made up of one or more wires. Those conductors which are a part of the main winding and which act to propel the armature, and herein termed the "propelling winding", are indicated by the numeral 23, with subscripts "a", "b", "c" and "d" to point out irregularities in the action of certain of these conductors. The conductors 23 are connected with the first and second segments 5 and 6 of the groups 5, 6, and 7, with the first and second segments 8 and 9 of the groups 8, 9, and 10, with the first and second segments 11 and 12 of the groups 11, 12, and 13 on the commutators, but the conductors are only supplied with current through those segments which are under the influence of that set of brushes in series with the source of current. Leads 24 connect conductors 23 with the first and second segments of the groups on the commutator 15, while leads 25 connect such conductors with corresponding segments on the commutator 16.

In addition to the propelling winding consisting of the conductors 23, the armature is provided with as many separate holding windings or circuits as there are movement cycles per revolution of the armature. The reference characters 26a, 26b, 26c, and 26d represent those conductors which are a part of one holding winding or circuit connected with the source of current through the commutator segments 7. The segments 10 and 13 are connected to holding windings 27 and 28, respectively. Only one of the holding windings or circuits is active during one cycle of motion.

Figure 4:
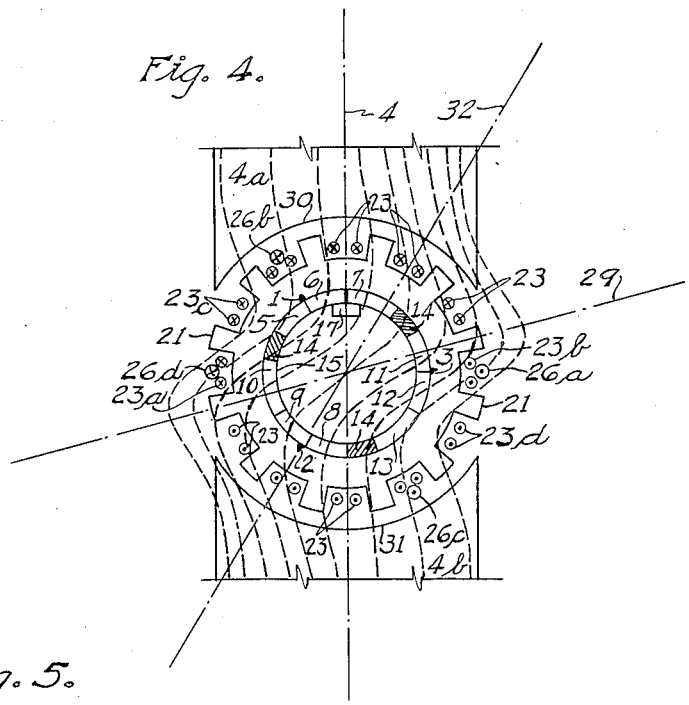
Fig. 4 is a diagrammatic view showing the field and its position with respect to various parts carrying current when the armature is in the position shown.

In Fig. 4 the direction of current is indicated by a cross when it enters the paper and by a dot when it leaves the paper through conductors shown perpendicular to the plane of the paper.

The armature may be of a usual design except that for this particular motor it should contain any even number of posts or slots divisible by three. This is not essential to the application of the principles here exemplified, but is necessary to put the machine in mechanical and magnetic balance and to make the amounts of motion delivered equal.

The reference character 29 represents the neutral plane of the armature, above which all conductors 23 carry current in one direction below which all conductors 23 carry current in the opposite direction.

The length of arc of the faces of the north and south poles 4a and 4b are represented by 30 and 31.

When referring to torque in the following description, I shall use the words "plus torque" to indicate torque in the counter-clockwise direction and the words "minus torque" to indicate torque in the clockwise direction.

Referring to Fig. 1, in which the predetermined point 1 lies in the plane of reference 4, if current is passed from brush 17 through segments 5 and 6 on commutator 15, into the winding through leads 24, and out through leads 25 and corresponding segments on the commutator 16, and finally through the brush 20, all conductors 23 above the neutral plane carry current toward the commutator 16 and all conductors 23 below the neutral plane carry current toward the commutator 15. Also, if the poles are excited in such a manner that flux flows from the pole face 30 to the pole face 31, each conductor will have exerted thereon a force acting in such a direction as to create a plus torque. Responding to this torque, the armature moves in a counter-clockwise direction.

Before proceeding further with armature rotation, attention is directed to the distorted field which is set up by armature reaction, the combined field which results from that set up by the poles and that set up by the armature being crowded into the leading pole tips, as shown in Fig. 4. Field distortion cooperates with the armature conductors to assist in torque reduction incident to termination of a movement cycle.

During the rotation of the armature, it will be readily seen that conductors 23 receive current and deliver torque as long as brushes 17 and 20 remain in contact with segments 6 and that conductors 26a, 26b, 26c, and 26d will receive current and deliver torque as soon as the segments 7 contact with the brushes 17 and 20. Also, because the resistance of any electric current carrier varies inversely as the area normal to the flow, brushes 17 and 20 act as slide valves on segments 6 and 7, decreasing the current in segments 6 and conductors 23 and increasing the current in the segments 7 and the conductors 26a, 26b, 26c, and 26d, as the armature proceeds in the counter-clockwise direction. The effect of this action is two-fold, in that the plus torque created by the conductors 23 is uniformly decreased from a maximum value to zero, while the current is uniformly increased from zero to a maximum in the conductors 26a, 26b, 26c, and 26d. Also, as segments 6 move from under brushes 17 and 20, the neutral plane 29 of the armature rotates from its original position in Fig. 1 through the position shown in Fig. 4 until such time as the segments 6 leave the brushes 17 and 20. This action causes conductors 23a and 23b, Fig. 4, to enter the distorted field at a point of maximum density; and, because the direction of the field with respect to these conductors has been changed while the current still flows in the original direction, the torque exercised by these conductors is minus. Also, due to field distortion, the conductors 23c and 23d do not cut any lines and hence develop no torque. Therefore, because the conductors 23c and 23d develop no torque and because conductors 23a and 23b cause a minus torque to exist coupled with uniform decrease in current in all the conductors 23 as segments 6 leave the brushes 17 and 20, the plus torque is rapidly reduced from a maximum value to zero.

Figure 2:
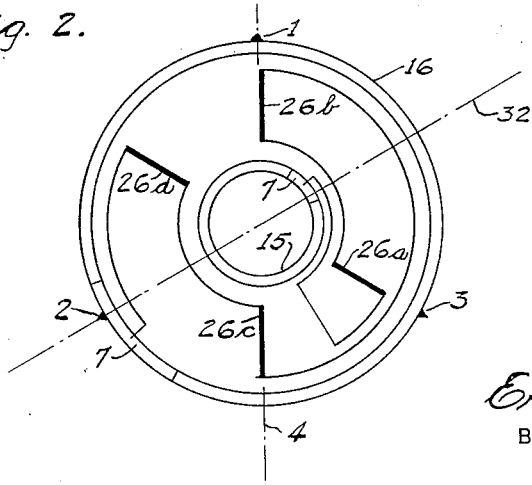
Fig. 2 is a diagrammatic circular development of one holding circuit.

In Figs. 1 and 2, it will be found that conductors 26a and 26c are connected so as to carry current toward commutator 15 and conductors 26b and 26d so as to carry current toward the commutator 16. Hence, as segments 7 come into contact with the brushes carrying current, conductors 26b and 26c exert a plus torque while conductors 26a and 26d exert a minus torque, but because conductors 26a and 26d are operating in a more dense field than conductors 26b and 26c, Fig. 4, the net torque is minus and the effect is to brake the counter-clockwise rotation of the armature. It will now be seen that, by varying the length of arc of the segments 6 and 7, the conductors 23 and 26a, 26b, 26c, and 26d may be continued in operation for a greater or lesser period of armature rotation.

At the instant when segments 6 leave the brushes 17 and 20, the conductors 23 cease to act and armature reaction consequently ceases, at which time the field through the armature assumes its normal straight path. Conductors 26a, 26b, 26c, and 26d are then moving in a normal field, 26a and 26b under the influence of the pole face 30 and 26c and 26d under the influence of the pole face 31. Moreover, conductors 26a and 26b act together as a coil, as do conductors 26c and 26d, and thus will continue to move in the normal field until such time as they include the maximum amount of field flux, at which time they will stop and remain stationary as long as current is supplied to the holding circuit through segments 7, Fig. 6. Therefore, by making the pole faces 30 and 31 to conform to such dimensions so that the field flux may just be included between conductors 26a and 26b and between conductors 26c and 26d, a means is provided for bringing the armature to rest.

By placing the center line between conductors 26a and 26b, as well as that between the conductors 26c and 26d, in the plane 32, Figs. 2 and 4, which includes the predetermined point 2 and the axis of the armature, an accurate means is provided for bringing the armature to rest when the predetermined point 2 lies in the plane of reference.

Figure 6:
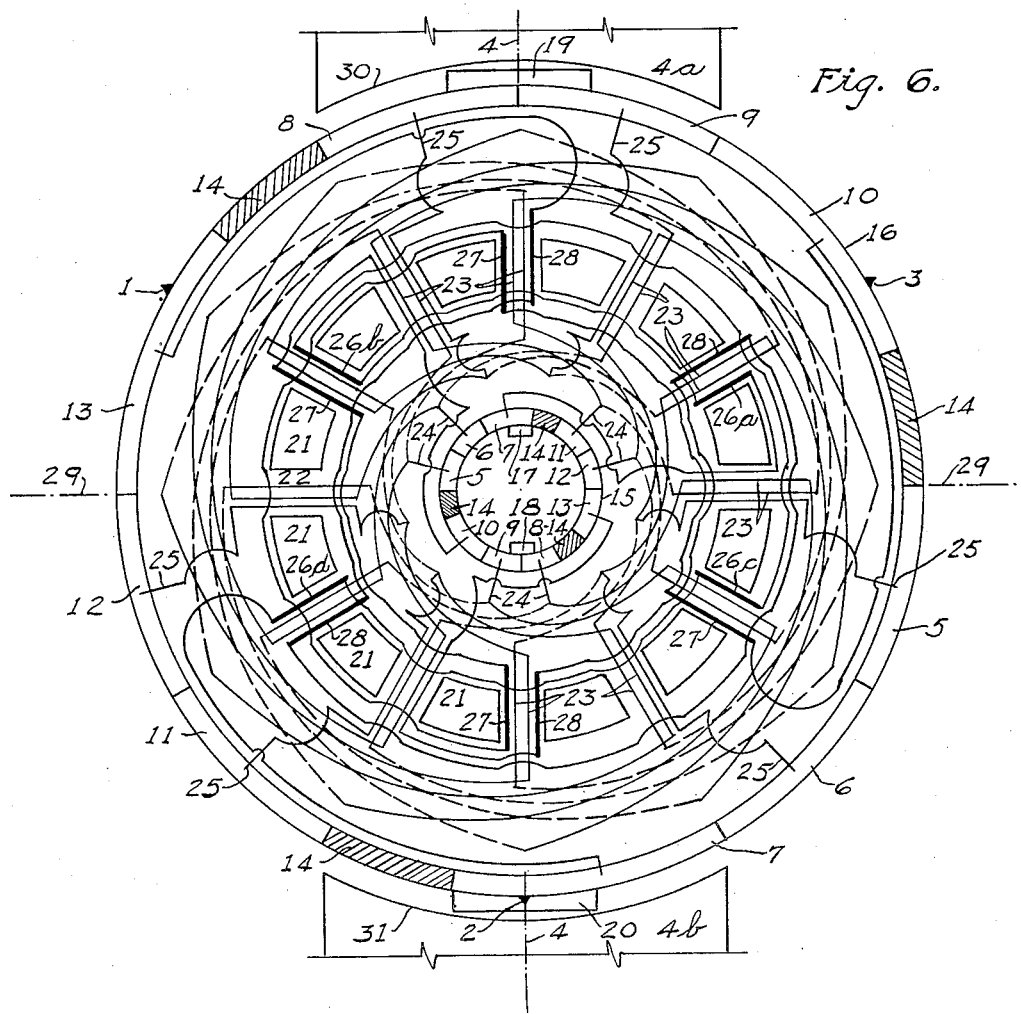
Fig. 6 is a view similar to Fig. 4 but showing the rotor advanced by one movement cycle from the position shown in the latter view.

As will be apparent from Fig. 6, when the point 2 nears its position of rest in the plane of reference, commutator segments 8 and 9 contact brushes 19 and 18. By means which will be presently explained, brushes 17 and 20 are cut out of circuit and brushes 19 and 18 are cut in at the instant when further motion of the armature is required. The current now enters the conductors 23 through segments 8 and 9 on commutator 16 and leaves by way of the corresponding segments on the commutator 15. Hence, by a proper selection of leads to either commutator, I repeat all of the electrical conditions that obtained within the armature when it first started to move, and the functions that were performed by conductors 23 above and below the neutral plane are again performed by those conductors which now lie above and below that plane. The functions performed by the conductors 26 and the segments 7 are now repeated by the conductors 27 and the segments 10. Likewise, if the various commutator segments with their respective leads are grouped as described and placed around the commutator in sequence at equal intervals, separated from each other by segments of dielectric 14, a means is provided for securing equal fractional turns of the armature for each revolution thereof.

Figure 5:
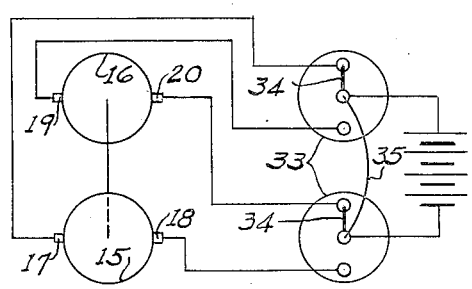
Fig. 5 is a wiring diagram showing the connections between the motor and the source of electric current.
Figure 3:
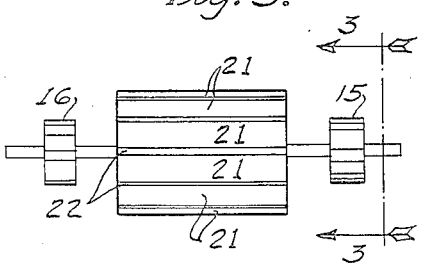
Fig. 3 is a side elevation of the armature showing the relation of the commutators to the laminations.

The pairs of brushes 17 and 20 and 19 and 18 are rendered alternately effective and the frequency of the motor is controlled by any suitable means. For example, Fig. 5 shows a convenient means for accomplishing these results. Brushes 19 and 18 are shown cut out of the circuit while brushes 17 and 20 are in series with the source of current through the distributors 33 whose rotors 34 are rigidly connected by the shaft 35. When the shaft 35 is rotated through 180 circular degrees, either manually or otherwise, the rotors 34 then connect the brushes 19 and 18 in series with the source of current while the brushes 17 and 20 are cut out. This action may continue indefinitely and the frequency with which the motor described moves is thereby governed.

From the structure described, it will be apparent that the armature has successive cycles of movement each 60 circular degrees in extent. Assuming that the armature starts from the position shown in Fig. 1, in which the point 1 is in the plane of reference 4, then the first cycle of counter-clockwise movement brings the point 2 into the plane of reference, as shown in Fig. 6; the second cycle brings the point 3 into the plane; the third cycle brings the point 1 into the plane 180 degrees from the position shown in Fig. 1; the fourth cycle brings the point 2 into the plane at the top of Figs. 1 and 6; the fifth cycle brings the point 3 into the plane at the bottom; and the sixth cycle brings the point 1 into the plane at the top, which is the starting position, as shown in Fig. 1.

With the structure heretofore described, the armature is always stopped so that a pair of brushes engage both the first and second segments, or the propelling winding segments, of diametrically opposed segment groups; and, when such brushes are placed in circuit, the motor starts in the usual way, the coils undergoing commutation being short circuited through the brushes, since the latter are each engaging two segments. Just as soon as current is supplied from the brushes to the propelling winding, the field suffers distortion, as shown in Fig. 4, this distortion continuing as long as current flows in the propelling winding. As soon as the brushes leave the first segments, the commutating action ceases for the remainder of the movement cycle; and, as soon as the center lines of the brushes move past the center lines of the second segments, the neutral plane moves from its normal position and in the direction of rotation with the effect of torque reduction due to minus torque in some conductors, zero torque in other conductors, reduced current flowing in the propelling winding because of diminishing contact area of the brushes with the second segments, and the minus torque condition occurring with the effective holding winding as long as current is supplied to the propelling winding.

It will be apparent to those skilled in the art that the principles of my intermittent rotary motor may be variously applied: any suitable number of pairs of poles may be employed; the segment group arcs may be made longer or shorter; any suitable number of propelling winding segments may be incorporated in the groups; and the segments may be variously proportioned. Any suitable brush width may be employed so long as the arc of contact thereof does not exceed the arcuate length of the dielectric segments 14. With a two-pole machine, as heretofore set forth, to secure magnetic and running balance, the rule is that any even number of armature posts or slots may be employed so long as the number is divisible by three.

For a four-pole machine, the rule for magnetic and running balance is any even number of posts or slots divisible by four. With a four-pole machine, only two holding circuits are needed regardless of whether two or four predetermined points are provided for. If the arrangement is for four predetermined points, the brushes acting together slide on the same commutator, whether the machine be of the two-pole or of the four-pole type. Three predetermined points cannot be arranged for a four-pole machine but can be used with a two-pole machine, as heretofore described, or with a six-pole machine, in which case the brushes acting in unison do not slide on the same commutator, but on opposite commutators, as shown on the drawings.

Where the motor is provided with a ground return, the return brush may be omitted and a single commutator is, therefore, sufficient.

Figure 7:
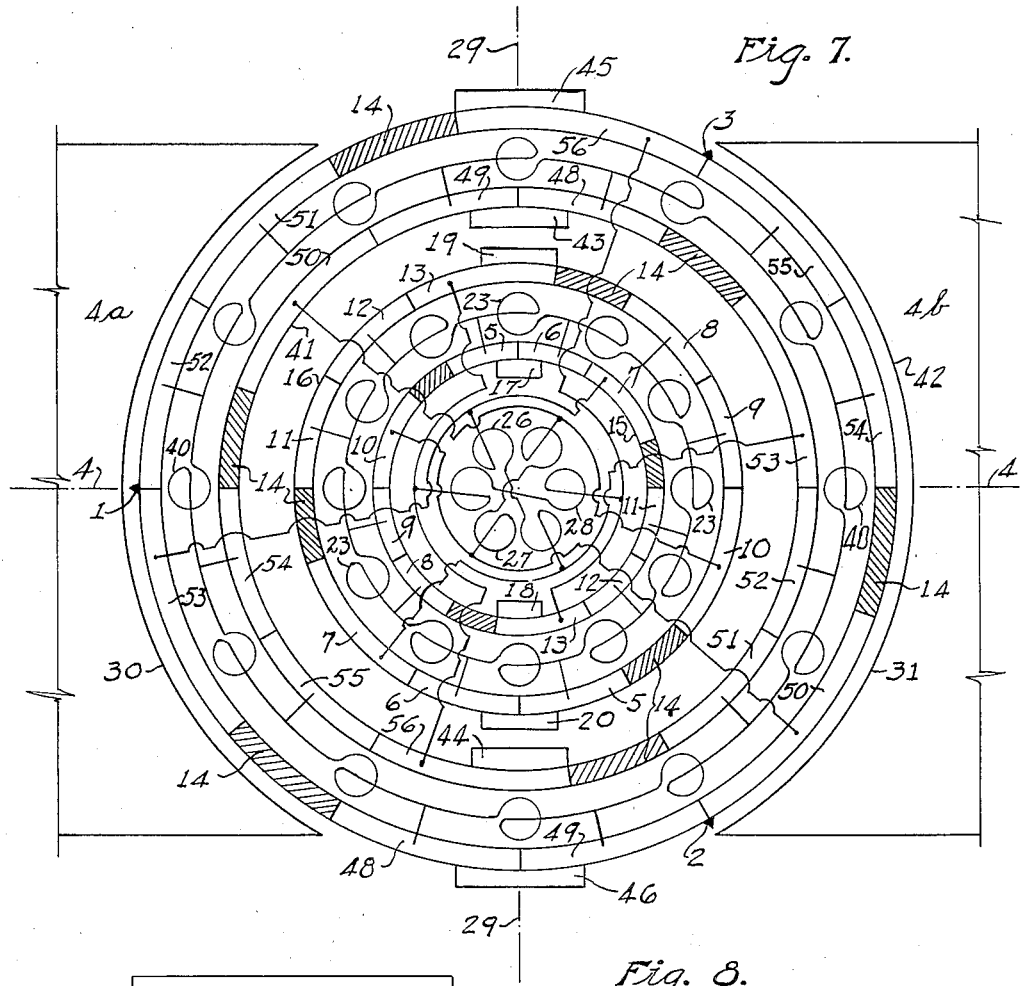
Figs. 7 and 8 show a modified form of my invention wherein the motor is reversible.
Figure 8:
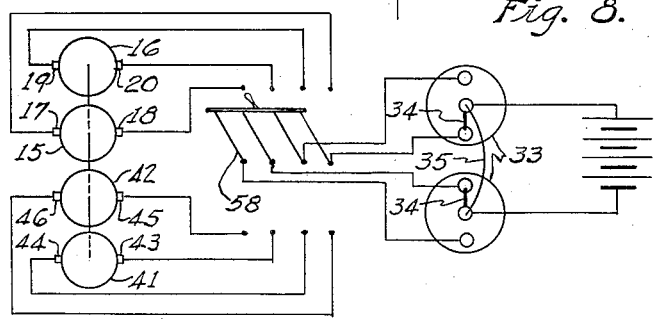

In Figs. 7 and 8, I show application of the foregoing principles in the provision of a reversible, intermittent rotary electric motor. The essential structure for counter-clockwise rotation is the same as that heretofore described, so the same reference characters are used in connection therewith.

Since the field remains unchanged, whether the motor is operated clockwise or counter-clockwise, it is necessary to reverse the direction of flow in the propelling winding, and, accordingly, an additional propelling winding 40 is provided on the armature. An additional pair of commutators 41 and 42 are arranged on the armature and have the segments thereof connected to the propelling winding 40 and to the holding winding 26, 27 and 28. Brushes 43 and 44 cooperate with the commutator 41 and brushes 45 and 46 with the commutator 42.

The commutators 41 and 42 each have three groups of segments 48, 49 and 50; 51, 52 and 53; and 54, 55 and 56. Because of clockwise direction of rotation, these contacts are reversely arranged with respect to the segments on the commutators 15 and 16. As with the commutators 15 and 16, like groups of segments on the commutators are spaced 180 circular degrees apart. The first and second segments 48, 49; 51, 52; 54, 55 are connected to the propelling winding 40, while the third segments 50, 53 and 56 are connected to the holding windings heretofore described. If it was attempted to use the same propelling winding for both directions of rotation, difficulty would be experienced on account of the holding windings.

As already described for counter-clockwise rotation, the pairs of brushes 17, 20 and 19, 18 are rendered alternately effective by a distributor. The pairs of brushes 44, 45 and 46, 43 are rendered alternately effective in the same manner. The counter-clockwise brushes 17, 20 and 19, 18 are cut out when the clockwise brushes 44, 45 and 46, 43 are effective and vice versa, and a double-throw switch 58 is employed for this purpose.

While I have shown my invention in but two forms, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the claims.

What I claim is:

1. In an intermittent rotary electric motor having relatively movable field and armature elements, propelling and holding means on the armature element, means utilizing relative movement of the elements to control the supply of electric current to the propelling and holding means so as to secure starting and stopping of the movable element, and means for controlling the supply of electric current to the last-named means so as to secure alternate dwells and movement cycles of the motor.

2. In an intermittent rotary electric motor having relatively movable field and armature elements, propelling and holding means on the armature element, alternately effective means incorporated within the motor structure and utilizing relative movement of said elements to control the supply of electric current to said propelling and holding means to secure starting and stopping of the movable element of the motor to provide for movement cycles thereof, the completion of one movement cycle with one means effective bringing the other means into initial effective position for the succeeding movement cycle, and distributor means for supplying electric current to the one of said means in initial effective position.

3. In an electric motor, field and armature elements, a propelling winding and holding means on the armature, means controlling the application of electrical energy to the propelling winding and to the holding means so that the motor moves for a fractional turn, and means for supplying electric current to the controlling means so that the motor moves step-by-step in fractional turns.

4. In an electric motor, relatively movable field and armature elements, propelling and holding winding means on the armature, and means for controlling the application of electric current to the propelling and holding winding means so that the motor moves step-by-step, said holding winding means including coils which, when energized, cooperate with the field to stop the rotor in predetermined positions and said holding winding means being energized by said controlling means as the end of a movement step is approached.

5. The combination as claimed in claim 4 wherein the field pole faces and the holding winding coils are so dimensioned that the latter include the maximum flux when disposed normal to the flux.

6. In an electric motor, a stator and a rotor having field and armature elements, means for producing intermittent fractional turn movement cycles of the rotor including propelling and holding windings on the armature element, and means responsive to relative movement of the stator and of the rotor for controlling the application of electric current first to the propelling winding, then both to the propelling and effective holding winding and finally to the holding winding during each movement cycle.

7. In an intermittent rotary electric motor, relatively movable field and armature elements, propelling, and holding windings on the armature element, commutator means including circumferentially-spaced groups of segments, each group including segments connected to the propelling and holding windings, a pair of brush means cooperating with the commutator means and arranged so that, as one brush means engages a holding winding segment of a group to terminate a movement cycle, the other brush means engages a propelling winding segment of another group, and means for alternately supplying electric current to the brush means.

8. In an intermittent rotary electric motor, relatively movable field and armature elements, propelling and holding windings on the armature element, commutator means including circumferentially-spaced groups of segments, each group including a plurality of segments connected to the propelling winding followed by a segment connected to a holding winding, a pair of brush means cooperating with the commutator means and arranged so that, as one brush means engages a holding winding segment of a group to terminate a movement cycle, the other brush means engages propelling winding segments of the next group, and means for alternately supplying electric current to the brush means.

9. The combination as claimed in claim 8 wherein each group of segments includes first and second segments connected to the propelling winding and a third segment connected to a holding winding and wherein the pair of brush means is so arranged that, with termination of a movement cycle incident to engagement of one brush means with the holding segment of one group, the other brush means is positioned to engage both the first and second segments of the next group.

10. In an intermittent rotary electric motor wherein a plurality of movement cycles occur during each revolution, relatively movable field and armature elements, a propelling winding on the armature element, a plurality of holding windings on the armature element, a plurality of circumferentially-spaced groups of commutator segments, the groups including first and second segments connected to the propelling winding and a third segment connected to a holding winding, first and second brush means cooperating with the segment groups so that, with a first brush means in engagement with a third segment of a group at termination of a movement cycle, the second brush means engages both the first and second segments of the next group, whereby the engagement of either brush means, first with the first and second segments, next with the second segment and then with the second and third segments of a group effects decrease in torque during each movement cycle prior to full engagement of the brush means with the holding segment of the group, and means for alternately supplying electric current to the first and second brush means.

11. In an electric motor, a stator having a pair of poles, a rotor, propelling and holding windings on the rotor, a pair of commutators each including circumferentially-spaced groups of segments, each group including segments connected to the propelling and holding windings, brushes cooperating with the commutators and each brush having a dimension circumferentially of the rotor not exceeding the circumferential spacing between adjacent groups on the commutator with which the brush is associated, the commutators and the brushes being relatively so arranged that, when one pair of brushes engages holding segments of a pair of groups on the commutators, a second pair of brushes engages propelling segments of another pair of groups on the commutators, and means for alternately supplying electric current to the pairs of brushes.

12. In an electric motor, field and armature elements, propelling means on the armature element and which, when supplied with electric current, cooperates with the field to produce relative movement of said elements, holding means on the armature element and which, when supplied with electric current, cooperates with the field to retard motion of the movable element and to hold said element in predetermined positions, and means responsive to relative movement of said elements to provide for supplying electric current alternately to the propelling and to the holding means.

13. In an electric motor, relatively movable field and armature elements, propelling and holding means on the armature element, alternately effective means responsive to relative movement of said elements for supplying electric current first to the propelling means and then to the holding means, and means for supplying electric current alternately to said alternately effective means.

14. In an electric motor, relatively movable field and armature elements, propelling and holding windings on the armature element, alternately effective means responsive to relative movement of said elements first to supply commutated electric current to the propelling winding and then to supply non-commutated electric current thereto followed by the supply of electric current to the holding winding, and means for supplying electric current alternately to said means.

15. In an intermittent rotary electric motor having relatively movable elements, one of said elements providing a field and the other element having propelling and holding means cooperating with the field, first and second means responsive to relative movement of said elements for supplying electric current alternately to the propelling means and to the holding means to secure alternate movements and dwells of the motor, and means for alternately supplying electric current to the first and second means.

16. In an electric motor having relatively movable elements, means carried by the elements and providing for operating cycles, each cycle including a movement phase followed by a dwell phase, first and second means responsive to motor movement to supply electric current alternately to said means to effect said operating cycles, and means for supplying electric current alternately to said first and second means.

17. In an intermittent rotary electric motor, field and armature elements, a propelling winding on the armature element, first and second means for supplying electric current to the winding to effect successive movements of the armature element, each of said means providing, in response to motor movement, first for commutated flow of electric current in the propelling winding to provide maximum torque followed by non-commutated flow of electric current in the propelling winding so that, due to the distorted field set up by armature reaction and rotation, the torque is decreased as the end of each movement is approached, and means for alternately supplying electric current to said first and second means.

18. In an intermittent rotary electric motor, field and armature element; propelling and holding windings on the armature elements; first and second means for supplying electric current to the windings to effect motor movements followed by dwells; each of said means providing, in response to motor movement, first for commutated flow of electric current in the propelling winding to develop maximum torque and then for non-commutated flow of electric current in the propelling winding, so that, due to the distorted field set up by armature reaction and rotation, the torque is reduced as the end of each movement is approached, followed by flow of electric current in the holding winding to bring the motor to a stop; and means for alternately supplying electric current to said first and second means.

19. In an electric motor, field and armature elements, propelling and holding windings on the armature element, first and second means alternately responsive to relative movement of the elements to provide for successive cycles of energization of the propelling and holding windings, and means for supplying electric current alternately to the first and second means.

ERNEST A. HECKLER.